United States Patent
Bankers et al.

(10) Patent No.: US 7,984,114 B2
(45) Date of Patent: Jul. 19, 2011

(54) DIRECT ACCESS TO CONTENT AND SERVICES AVAILABLE ON AN ENTERTAINMENT SYSTEM

(75) Inventors: David M. Bankers, Sioux Falls, SD (US); Benjamin M. Arnold, Sioux Falls, SD (US); James L. Fenno, Sioux Falls, SD (US); Leon P. Stoel, Sioux Falls, SD (US); Derin M. Zerr, Sioux Falls, SD (US)

(73) Assignee: LodgeNet Interactive Corporation, Sioux Falls, SD (US)

( * ) Notice: Subject to any disclaimer, the term of this patent is extended or adjusted under 35 U.S.C. 154(b) by 967 days.

(21) Appl. No.: 11/052,596

(22) Filed: Feb. 7, 2005

(65) Prior Publication Data

US 2005/0193417 A1   Sep. 1, 2005

Related U.S. Application Data

(60) Provisional application No. 60/548,476, filed on Feb. 27, 2004.

(51) Int. Cl.
*G06F 15/16* (2006.01)
*H04N 7/16* (2006.01)
*H04N 7/173* (2011.01)

(52) U.S. Cl. ............ 709/219; 709/248; 725/29; 725/103

(58) Field of Classification Search .......... 709/201–207, 709/217–219, 229, 238–244, 248; 725/16, 725/25, 29, 39, 87, 103
See application file for complete search history.

(56) References Cited

U.S. PATENT DOCUMENTS

| | | | |
|---|---|---|---|
| 5,557,721 A * | 9/1996 | Fite et al. | 705/14.1 |
| 6,404,977 B1 * | 6/2002 | Iggulden | 386/248 |
| 6,654,721 B2 * | 11/2003 | Handelman | 704/270 |
| 7,797,191 B2 * | 9/2010 | Cotten et al. | 705/14.5 |
| 2002/0004839 A1 * | 1/2002 | Wine et al. | 709/231 |
| 2002/0010927 A1 * | 1/2002 | Kim | 725/40 |
| 2005/0273388 A1 * | 12/2005 | Roetter | 705/14 |
| 2006/0026645 A1 * | 2/2006 | Milnes et al. | 725/46 |
| 2007/0005795 A1 * | 1/2007 | Gonzalez | 709/232 |
| 2007/0186228 A1 * | 8/2007 | Ramaswamy et al. | 725/14 |
| 2007/0198356 A1 * | 8/2007 | LaCroix | 705/14 |
| 2007/0248310 A1 * | 10/2007 | Feininger et al. | 386/46 |
| 2008/0301264 A1 * | 12/2008 | Mathai et al. | 709/219 |
| 2009/0030978 A1 * | 1/2009 | Johnson et al. | 709/203 |
| 2011/0055026 A1 * | 3/2011 | Hayward | 705/14.73 |

* cited by examiner

*Primary Examiner* — Asad M Nawaz

(74) *Attorney, Agent, or Firm* — Kinney & Lange, P.A.

(57) ABSTRACT

A method and system for providing direct access to content available on an entertainment system. The entertainment system includes a head end and a plurality of user terminals connected by a distribution system. In operation of the entertainment system, a display promoting content available for direct access by a user is provided at a user terminal. A selection input made by the user on an input device is received at the user terminal. The content being promoted when the selection input was made by the user is then provided from the head end to the user terminal.

8 Claims, 4 Drawing Sheets

DIRECT ACCESS TO CONTENT AND SERVICES AVAILABLE ON AN ENTERTAINMENT SYSTEM

CROSS REFERENCE TO RELATED APPLICATION(S)

This application claims priority from U.S. patent application Ser. No. 60/548,476, filed Feb. 27, 2004, for "Method and System for Providing Direct Access to Content and Services Available on an Entertainment System" by David M. Bankers, Benjamin M. Arnold, James L. Fenno, Leon P. Stoel, and Derin M. Zerr, which is herein incorporated by reference in its entirety.

BACKGROUND OF THE INVENTION

The present invention relates to systems that provide multimedia entertainment at hotels and other temporary lodging facilities. In particular, the present invention is a method and system for providing users direct access to content and services available on an entertainment system.

The past two decades have seen the wide scale introduction of entertainment systems in hotels and other lodging facilities. These systems provide a variety of services to the user through a television. The services typically include regular off-air television programs, pay-per-view movies, video games, Internet access, and services such as video shopping and video checkout.

A typical entertainment system contains a head end, a distribution system, and user terminals located in each of the guest rooms. The head end includes devices to generate entertainment content such as movies and video games, as well as devices to provide Internet access and generate interactive menus and other services. The head end also includes modulators necessary to place the television signals from the various sources onto the appropriate channels for transmission through the distribution system to the user terminals. Alternatively, content may be provided to the user terminals using digital distribution methods. A host computer coordinates operation of the entertainment system by receiving keystroke information from the user terminals and controlling operations of various sources of television signals so that the user receives the entertainment or services which he or she has requested.

There is a continuing need for new and improved offerings which will result in higher purchase rates through the entertainment system. At the same time, any additional products/services which also require significant increases in capital investment in the entertainment systems are difficult to justify. For example, if a new service will require additional capital equipment to be installed in every guest room, or will require the addition of expensive hardware or software at the head end, the total cost of the additional hardware and software must be weighed against the increase in purchases which can be expected from the additional capital investment.

In conventional entertainment systems, if the user decides to purchase content or services on the entertainment system, the guest must navigate through various interactive menus until the desired content or service is located. The user then selects the desired content or service, and the host computer activates the requested service. The present invention allows a user to immediately purchase content or services available on the entertainment system without having to navigate through a series of interactive menus.

BRIEF SUMMARY OF THE INVENTION

The present invention is a method and system for providing direct access to content available on an entertainment system. The entertainment system includes a head end and a plurality of user terminals connected by a distribution system. In operation of the entertainment system, a display promoting content available for direct access by a user is provided at a user terminal. A selection input made by the user on an input device is received at the user terminal. The content being promoted when the selection input was made by the user is then provided from the head end to the user terminal.

In one embodiment, the user enters keystrokes on the input device in response to instructions provided to the user at the user terminal, typically in the form of an on-screen display. The on-screen display is typically provided on a content promotions channel which is transmitted to the user terminals to promote content available on the entertainment system. The instructions in the on-screen display describe the input device keystrokes required for direct access to the content. In one embodiment, keystrokes entered by the user are time-stamped at the user terminal as the keystrokes are entered on the input device by the user. The time-stamped keystrokes are then provided to the head end by the user terminal. Content is then transmitted to the user terminals based on the time-stamped keystrokes and the content being promoted on the content promotions channel when the keystrokes were time-stamped.

DETAILED DESCRIPTION

Figure 1:
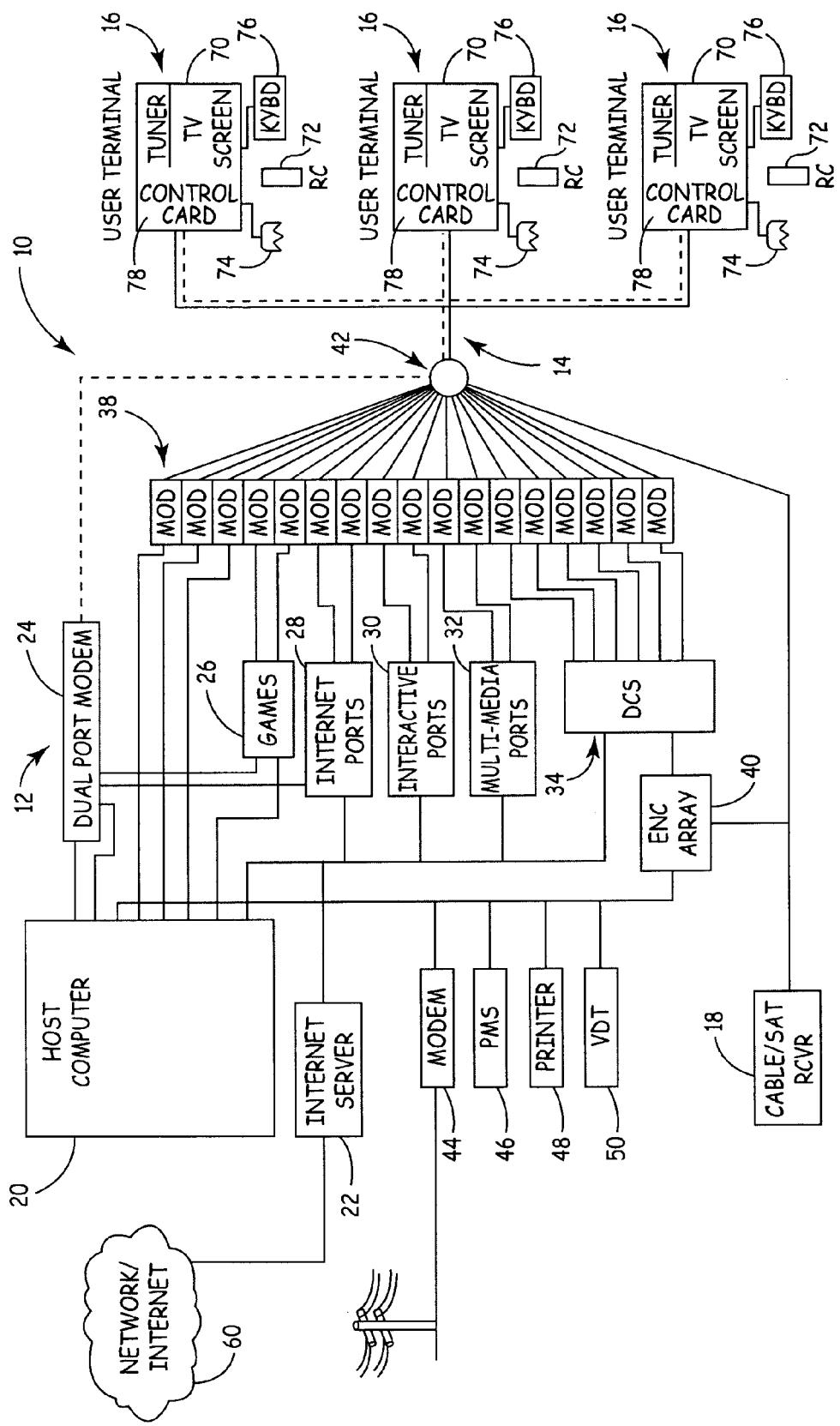
FIG. 1 is a block diagram of an entertainment system capable of providing direct access to content and services available on the entertainment system.

FIG. 1 is a block diagram showing a system overview of hotel entertainment system 10 which delivers entertainment content such as television programming, digital music, video-on-demand movies, interactive video games, Internet access, and other interactive video services and features to individual guest rooms of a hotel or other temporary lodging facilities. Among the features offered to a user of entertainment system 10 is direct access to content available on entertainment system 10 (described in more detail below). Entertainment system 10 includes four primary portions: head end 12, distribution system 14, user terminals 16, and cable/satellite receiver 18.

Audio/video RF signals for all channels of the cable television system are provided from head end 12. The audio/video RF signals from head end 12 may include off-air local television channels, direct broadcast satellite programming, interactive menus and interactive program guides, video-on-demand programming, interactive video games, Internet services, and other interactive video and multi-media services. Based on system control data transmitted and received via distribution system 14 from user terminals 16, head end 12 controls the operation of interactive menus and program guides, video-on-demand movies, interactive games, Internet services, and other interactive services. In one embodiment, distribution system 14 is an MATV cable distribution system conventionally used in hotels and other lodging facilities. Distribution system 14 permits the transmission of both audio/video RF signals, as well as two-way data and digital communication (typically RF) signals between head end 12 and user terminals 16.

Head end 12 includes host computer 20, Internet server and network interface 22, dual ported modem 24, game platform 26, Internet ports 28, interactive ports 30, multi-media ports 32, digital content server (DCS) 34, a bank of selectable modulators 38, encoder array 40, combiner/diplexer 42, telecom modems 44, property management system (PMS) 46, printer 48, and video display terminal (VDT) 50.

Host computer 20 runs software for coordinating the operations of components of head end 12. Host computer 20 houses several different computer cards and components. In the embodiment shown in FIG. 1, host computer includes an intelligent communications processor (ICP) card, a multi-port serial card, a number of interactive video port cards, an SCSI interface card, and an ethernet card. In addition, host computer 20 also houses storage devices such as a floppy disk drive, a backup drive, a CD-ROM drive, and a hard disk drive.

Host computer 20 manages the operation of several other devices of head end 12, together with communication tasks. Host computer 20 communicates with dual port modem (DPM) 24, encoder array 40, modem 44, property management system 46, printer 48, and video display terminal 50 over serial lines such as RS-232 lines connected to the serial card of host computer 20.

Host computer 20 is in charge of polling all of the user terminals 16 for keystroke activity. The polling function is performed by ICP through DPM 24. ICP communicates with DPM 24 over a high speed serial line. The results of the polling are received back over distribution system 14 and are routed through diplexer/combiner 42 to DPM 24. Depending upon the particular keystrokes that are returned, DPM 24 will return the keystrokes to the serial card of host computer 20, to game platform 26, or to Internet ports 28 through serial lines, or other services which may be implemented. Polling of user terminals 16 is an important aspect of providing direct access to content available on entertainment system 10 according to the present invention, as will be described below.

Host computer 20 communicates with game platform 26 by a high speed serial line between the SCSI port of host computer 20 and game platform 26. For example, game programs stored by host computer 20 are downloaded to the individual game engines of game platform 26 based upon game ordering and selections made by the user through user terminals 16.

Host computer 20 communicates through its ethernet card with Internet server 22, Internet ports 28, interactive ports 30, multi-media ports 32 and digital content server 34. Internet server 22 provides a communication interface between head end 12 and Internet 60.

The outputs of interactive ports of host computer 20, as well as the outputs of game platform 26, Internet ports 28, interactive ports 30, multi-media ports 32, and digital content server 34 are baseband audio/video signals which are provided to inputs of bank of modulators 38.

Game platform 26 is a device that allows a user to purchase an interactive video game and to view that game at user terminal 16. Game platform 26 sends game audio and video and game data through one of the modulators 38, to combiner/diplexer 42, and onto distribution system 14 to user terminals 16.

Game platform 26 receives information from host computer 20 from the SCSI card. Keystrokes which are received back from the user terminal 16 are received by DPM 24 and routed to the appropriate game engine of game platform 26 which corresponds to the user who has sent the keystroke.

Internet ports 28 send audio and video information from the Internet to the appropriate user terminal. The outputs of Internet ports 28 are connected to the appropriate modulator, so that the audio and video is placed on a channel to which the user terminal of the user conducting the Internet session is tuned.

Interactive ports 30 provide audio and video associated with menuing, program guides and other interactive services. These include user services such as interactive access controls, interactive playback controls, video checkout, interactive shopping, surveys, opinion polls, and room service ordering.

Multi-media ports 32 provide a wide variety of different audio and visual programs to a subscriber. These can include, for example, video directories, advertising, content promotions, and other information services.

Digital content server 34 includes digital storage (e.g., a RAID hard disc array) with storage capacity to store all desired program content to be offered to the user. This includes, for example, movies, music, web cinema, pre-recorded broadcast programs from a central site, user-selected programs recorded for time-shifted viewing, and interactive media. The content is typically delivered to digital content server 34 either by periodically delivering the content to each entertainment system location, or via a content distribution system such as that described in U.S. patent application Ser. No. 09/896,921, entitled "System and Method for Content Delivery to Lodging Entertainment Systems," assigned to Lodgenet Entertainment Corporation, which is herein incorporated by reference. The content is stored in files in the digital storage, and each type of service has its own directory where its content is stored. The overall storage space is shared among the various services. The content is stored in an encoded format such as MPEG-2 or Windows Media Video (WMV) files.

Digital content server 34 includes decoders for converting the stored content to baseband audio/video during playback. The outputs of digital content server 34 are output ports which are connected to selected modulators 38.

Modulators 38 convert baseband video and audio signals received at their inputs to RF and deliver the signals to combiner/diplexer 42. Each modulator is set to modulate on a specific frequency or RF channel. The outputs of modulators 38 are connected to inputs of combiner 42.

As shown in FIG. 1, cable/satellite receiver 18 receives cable or satellite programming, which is supplied to combiner/diplexer 42. Receiver 18 provides the programming (which is the free-to-user television programs) on channels which are different from the channels produced by modulators 38. In that way, there is no channel overlap between the free-to-user television programming and the other offerings (such as pay-per-view movies or games).

Encoder array 40 is a computer with a group of tuner/encoder cards which can be scheduled to record any channel of the cable/satellite programming from receiver 18. Multiple encoder cards allow different channels to be encoded at the same time. Encoder array 40 receives instructions as to the channel and time of encoding from host computer 20. Once the program has been encoded to a file (such as an MPEG-2 or WMV file), the data is moved to digital content server 34 via an ethernet or SCSI connection. Once the file is stored in digital content server 34, a user can choose to playback the file (i.e., the recorded program). File names are unique, and typically identify the user and the program recorded so that multiple users can have files stored in digital content server 34, and a user can have multiple files. Recorded files can be deleted when the user who requested recording of that program checks out, or at a predetermined time after recording. Control of deleting files is by host computer 20.

Host computer 20 communicates with the owner/operator of entertainment system 10 through modem 44. The system owner and operator is typically remote from the hotel facility, and must receive usage, billing, and financial information in order to settle accounts with the hotel. In addition, control and troubleshooting information can be communicated to and from host computer 20 through modem 28.

Property management system (PMS) 46 is a computer system operated by the hotel to track charges incurred by individual users. These charges typically include room charges, as well as dining charges, room service, telephone charges, charges for use of hotel entertainment system 10, and a variety of other charges. As charges related to system 10 are incurred, host computer 20 communicates that information to PMS 46. During video checkout operations, host computer 20 communicates with PMS 46 to obtain the data necessary to show the user, on user terminal 16, a folio of charges associated with that user's room. The video checkout system allows the user to approve the charges and to authorize payment for those charges through a credit card number previously given to the hotel and stored in property management system 46.

User terminal 16 includes television 70, remote control 72, game controller 74, keyboard 76, and control card 78. Each television 70 has a television screen for viewing, and has an associated television tuner and a control card which interfaces user terminal 16 with distribution system 14 and head end 12.

Control card 78 of user terminal 16 receives keystrokes from remote control 72, game controller 74, and keyboard 76. In the case of remote control 72, the keystrokes are in the form of infrared signals which are transmitted from an infrared transmitter within remote control 72 to an infrared receiver associated with television 70. The keystrokes are passed by control card 78 to distribution system 14 back to head end 12. The user typically selects options by viewing interactive menus or instructions on the screen of television 70 and pressing keys of remote control 72 accordingly. These key presses are received and stored by control card 78. In response to polling signals from head end 12, control card 78 provides system data representing the keystrokes to head end 12 which indicates which key or keys have been pressed.

Video game controller (or game paddle) 74 is connected by a cable to television 70. Alternatively, game paddle 74 can be connected via an IR link. Keystrokes from game paddle 74 are supplied to control card 78, and then are supplied as part of system data in response to polling of user terminals 16 by head end 12. In some embodiments, game paddle 74 includes keys which duplicate keys on remote control 72 so that game paddle 74 can be used to initiate interactive sessions and order programs without the need to use remote control 72.

Keyboard 76 is connected to television 70 either through a cable or by an IR link. Keystrokes from keyboard 76 are supplied by control card 78 of user terminal 16 to head end 12 in response to polling. Keyboard 76 is useful for interactive services such as Internet, e-mail and computer games. Keyboard 76 can, in some cases, be used to initiate interactive sessions, order programs or select programs to be recorded, rather than using remote control 72.

When a user wishes to use entertainment system 10, the user presses a key on remote control 72 to turn on television 70. A main menu screen will first appear on the TV screen of user terminal 16. If the user wishes to view off-air or satellite programming which is free programming, those channels are accessible by pressing the channel up or channel down keys on remote control 72. If, on the other hand, the user wishes to view and perhaps select other offerings of system 10, such as video-on-demand movies, Internet access, interactive video games, recording of broadcast programs for time-shifted viewing, or interactive services, the welcome channel screen provides an instruction to the user to select a menu. Upon pressing the menu key, a signal is provided to control card 78, which stores the keystroke information until the next time that user terminal 16 is polled by head end 12. In response to polling, the keystroke indicating pressing of the menu key is supplied to head end 12. This results in host computer 20 selecting one of the interactive ports (which are either internal to host computer 20 or are part of interactive ports 30) to display a series of interactive menus which are navigated by the user through the use of keystrokes supplied by remote control 72 (or alternatively game paddle 74 or keyboard 76). Depending upon the selections made by the user in response to the screens which are displayed, host computer 20 will activate the requested service which may be provided by game platform 26, Internet ports 28, interactive ports 30, multi-mediaports 32, digital content server 34, or encoder array 40. The selected output is routed to a modulator representing one of the available channels and sends digital control signals to control card 78 of user terminal 16 to cause user terminal 16 to tune to the channel on which the requested service is to appear.

One of the channels that is typically available to all users as free programming on system 10 is a content promotions channel which promotes various content available for purchase on system 10. For example, movies, video games, and other services which are available for purchase on system 10 are promoted via a short video clip or "trailer" on the content promotions channel which provides the user a preview of the various content. Content available on system 10 may also at times be promoted on a scrolling text bar on television 70, on a hotel information channel (HIC) provided on television 70 which describes various amenities at the hotel including content available on system 10, on a content listing channel which sets forth specific content on system 10 (such as specific movies and video games available for purchase), on the welcome channel screen, on interactive menu screens, and so on. For ease of description, it will be understood that "content promotions channel" encompasses these and other vehicles for promoting content available on system 10.

In conventional systems, if the user decides to purchase content or services based on the preview on the content promotions channel, the user must press the menu key and navigate through various interactive menus as described above until the desired content or service is located. The user then selects the desired content or service, and host computer 20 activates the requested service.

The present invention allows a user to directly access content promoted on system 10 without having to navigate through interactive menus to find the desired content or service. Rather, the user simply presses a single key or a short combination of keys on an input device (such as remote control 72, game controller 74, or keyboard 76) as instructed on television screen 70, and the user is brought directly to the content or service (for free-to-user programming) or to a purchase screen for the selected content or service (for premium programming). If the user is brought to the purchase screen, the user finalizes the purchase and is brought to the selected content or service.

Figure 2A:
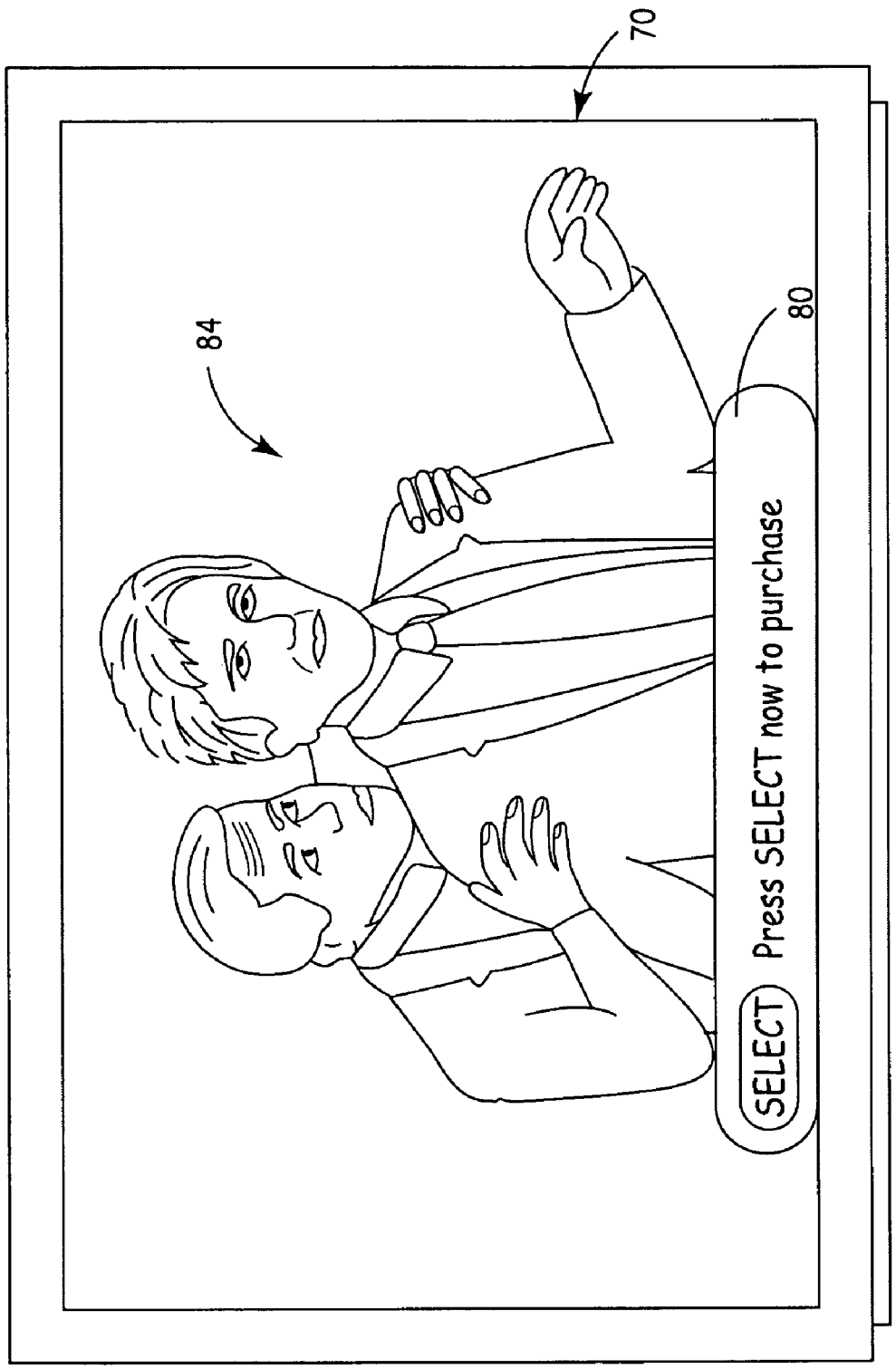
FIG. 2A shows a television at a user terminal with an on-screen display which provides instructions to a user for direct access to content available on the entertainment system.

FIG. 2A shows television 70 at user terminal 16 with on-screen display 80 which provides instructions to a user for direct access to content available on the entertainment system. On-screen display 80 is provided on content promotions channel 84, which is a free channel available for viewing by the user at user terminal 16. Content promotions channel 84 promotes various content available on system 10 sequentially, allowing the user to view short previews of the content to assist the user in determining the desirability of purchasing the various content. In the example illustrated in FIG. 2A, a short movie clip for a movie available for purchase on system 10 is being played.

As the short promotions are sequentially played on content promotions channel 84, on-screen display 80 continuously provides instructions to the user to perform an action (typically with remote control 72) to bring the user directly to the content being promoted (for free-to-user content) or to a purchase screen for the content then being promoted on content promotions channel 84 (for premium content). In the example shown in FIG. 2A, the instructions state "Press SELECT now to purchase." These instructions correspond to the use of remote control 72, which includes a key labeled "SELECT."

When the user presses the SELECT key on remote control 72, a signal is provided to control card 78, which stores the keystroke information. A "time stamp" associated with the keystroke is also stored with the keystroke information on control card 78. That is, control card 78 electronically records the time at which the selection on the remote control is made by the user. Control card 78 stores this information until the next time that user terminal 16 is polled by head end 12. In response to polling, the keystroke indicating pressing of the SELECT key, along with the time stamp information, is supplied to head end 12.

As content is sequentially promoted on content promotions channel 84, host computer 20 tracks what is being promoted at all times. That is, host computer 20 stores the start time and end time of each promotion on content promotions channel. In one embodiment, host computer 20 includes a logic state machine which changes state as the content being promoted on content promotions channel 84 changes. Thus, host computer 20 records the time when the logic state machine changes state to correspond with the changing sequential promotions on content promotions channel 84.

After the keystrokes at user terminal 16 have been polled by head end 12, host computer 20 associates the time-stamped keystroke with the content that was being previewed on content promotions channel 84 when the keystrokes were made. If the content selected is premium programming, host computer 20 subsequently selects one of the interactive ports to display an interactive menu which provides the user with the option to finalize purchase of the content selected. When the user finalizes the purchase, host computer 20 will activate the service that was being promoted when the SELECT key was pressed which, depending on the content then being promoted, may be provided by game platform 26, Internet ports 28, interactive ports 30, multi-media ports 32, digital content server 34, or encoder array 40. The selected output is routed to a modulator representing one of the available channels and sends digital control signals to control card 78 of user terminal 16 to cause user terminal 16 to tune to the channel on which the requested service is to appear.

On-screen display 80 is shown in FIG. 2A provided on content promotions channel 84 merely as an illustrative example. Alternatively, on-screen display 80 may also be provided in various other forms and on other channels on system 10. For example, on-screen display 80 may be configured to also include a promotion (textually, graphically, or otherwise) of content available on entertainment system 10 along with a set of instructions to directly access the content promoted. In this way, on-screen display may be provided on any channel at any time at user terminal 16 when, for example, new content becomes available on entertainment system 10 or when the entertainment system vendor or lodging facility wishes to promote a particular content or service. Furthermore, it should be noted system 10 may be programmed to allow any keystroke or combination of keystrokes for direct access to content, and the use of the SELECT key on remote control 72 is merely illustrative.

Figure 2B:
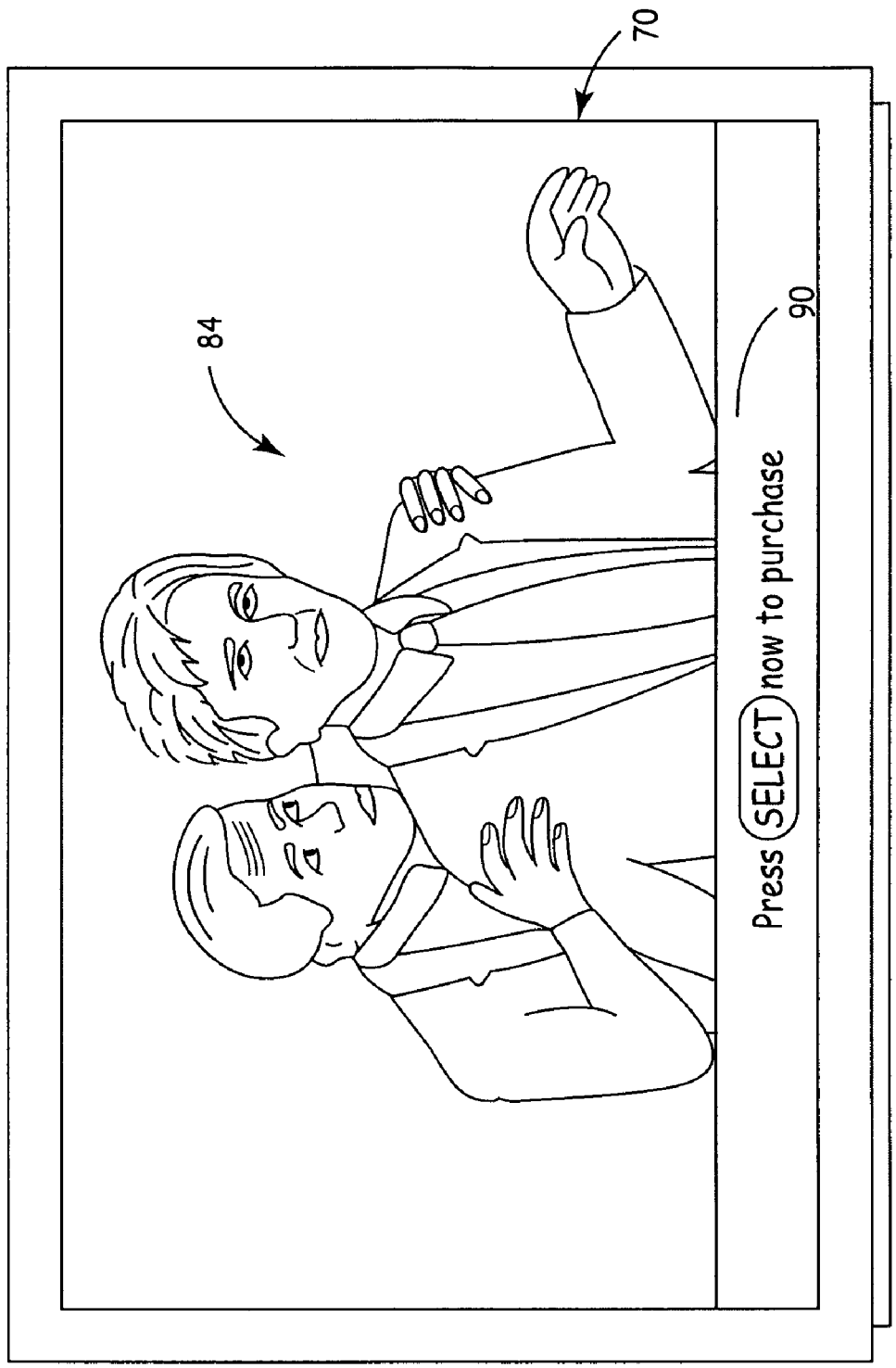
FIG. 2B shows a television with a scrolling message which provides instructions for direct access to content available on the entertainment system according to an alternative implementation of the first embodiment of the present invention.

The instructions and content promotions need not be provided on an on-screen display 80 as shown in FIG. 2A, and may be provided in any format that allows for instructions and/or content promotions to be provided to a user. For example, FIG. 2B shows television 70 with scrolling message 90 which provides instructions for direct access to content available on the entertainment system 10. The text provided in scrolling message 90 typically scrolls from right to left in FIG. 2B. The function and purpose of scrolling message 90 is substantially the same as that of on-screen display 80, allowing the user to enter a keystroke or combination of keystrokes at any time for direct access to the content or service then being promoted. Also, as with on-screen display 80, scrolling message 90 may be provided on any channel at user terminal 16 to promote content and services available on entertainment system 10.

Figure 3:
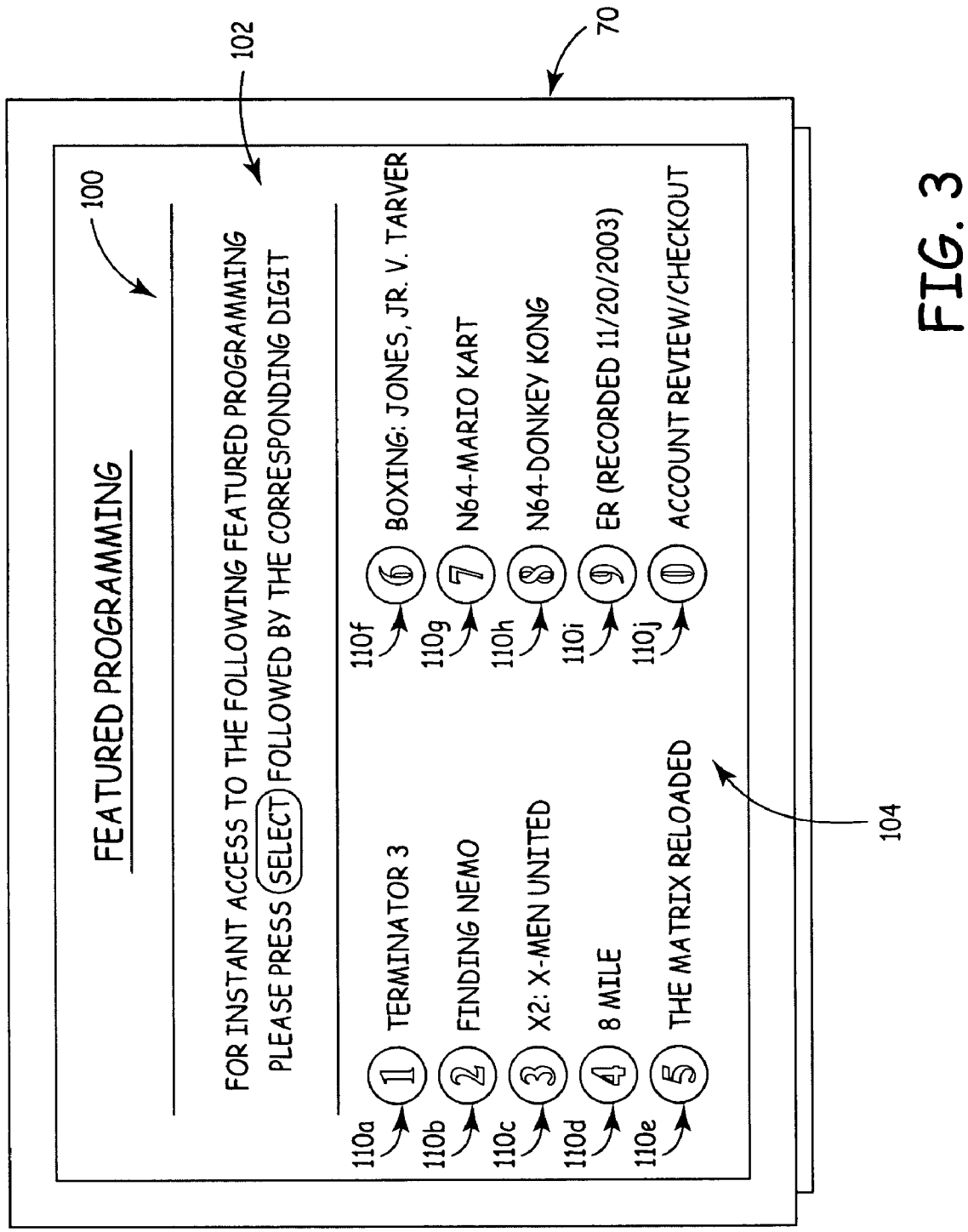
FIG. 3 shows a television on a channel which provides instructions to a user for direct access to content available on the entertainment system according to a second embodiment of the present invention.

FIG. 3 shows television 70 tuned to content listing channel 100 which provides instructions to a user for direct access to specific content available on entertainment system 10 according to a second embodiment of the present invention. Content listing channel 100 includes instruction field 102 and content field 104. Content field 104 includes a plurality of graphic buttons 110a-110j each associated with a specific item of content or service available for purchase or viewing on system 10. Each of graphic buttons 110a-110j includes a number which corresponds to a digit key provided on remote control 72.

When a user decides to select and perhaps purchase one of the content or service selections listed on content listing channel 100, the user follows the instructions provided in instruction field 102 to be brought directly to the content or service selected (for a free-to-user selection) or to a purchase screen to finalize purchase of the content or service (for a premium selection). In the example shown in FIG. 3, the user is instructed to press the SELECT key on remote control 72 followed by a digit key on remote control 72 corresponding to the content or service desired. When the user enters the desired combination of keys, signals are provided to control card 78, which stores the keystroke information until the next time that user terminal 16 is polled by head end 12. In response to polling, the keystroke information indicating pressing of the SELECT key followed by a digit key is supplied to head end 12. Depending upon the selection made by the user, host computer 20 will activate the requested service which may be provided by game platform 26, Internet ports 28, interactive ports 30, multi-media ports 32, digital content server 34, or encoder array 40. The selected output is routed to a modulator representing one of the available channels and sends digital control signals to control card 78 of user terminal 16 to cause user terminal 16 to tune to the channel on which the requested service is to appear.

As an example, a user may desire to view the video-on-demand movie "Finding Nemo" listed next to graphic button 110b on content listing channel 100. As instructed in instruction field 102, the user presses the SELECT key on remote control 72 followed by the "2" key on remote control 72. Since video-on-demand movies are premium programming, this results in host computer 20 selecting one of the interactive ports to bring the user to a purchase screen for "Finding Nemo." The user subsequently finalizes purchase of the movie, and host computer 20 activates the movie on digital content server 34. The movie is routed to a modulator representing an available channel and a digital control signal is sent to control card 78 to tune to the channel on which the movie is to appear.

It should be noted that system 10 may be programmed to instruct any keystroke or combination of keystrokes for direct access to content listed on content listing channel 100, and the use of the SELECT key in combination with a single digit is merely illustrative. For example, a larger listing of content and services could be provided on content listing channel 100, and a greater combination of keys (e.g., the SELECT key followed by two digits) could be entered to directly access the content. Furthermore, the listing of content on content listing channel 100 is changeable as new content becomes available on system 10 or when the entertainment system vendor or lodging facility wishes to promote a different content or service available on system 10. Finally, the content listed on content listing channel 100 is merely exemplary, and any content or service available on system 10 may be listed (e.g., video-on-demand movies, Internet access, interactive video games, recorded broadcast programs for time-shifted viewing, interactive services, pay-per-view events, etc.).

The present invention allows a user of an entertainment system to directly access content and services available on the entertainment system, allowing a user to circumvent navigation through various interactive menus to locate desired content or services promoted on the system. The entertainment system includes a head end and a plurality of user terminals connected by a distribution system. In use of the entertainment system, a selection made by a user on a remote control at a user terminal is time-stamped. The user terminal is then polled, typically by the head end, for the time-stamped selection made by the user. Content is then transmitted from the head end based on the time-stamped selection made by the user.

In one embodiment, the user enters keystrokes on the remote control in response to instructions provided to the user at the user terminal, typically in the form of an on-screen display. The on-screen display is provided on a content promotions channel which is transmitted to the user terminals to promote content available on the entertainment system. The instructions in the on-screen display describe the remote control keystrokes required for direct access to the content. Keystrokes entered by the user are time-stamped at the user terminal as the keystrokes are entered on the remote control by the user. The user terminal is polled, typically by the head end, for the time-stamped keystrokes. Content is then transmitted to the user terminals based on the time-stamped keystrokes and the content being promoted on the content promotions channel when the keystrokes were time-stamped.

Although the present invention has been described with reference to preferred embodiments, workers skilled in the art will recognize that changes may be made in form and detail without departing from the spirit and scope of the invention. For example, it will be understood that any entertainment system capable of providing a user with interactive options may be used, including a purely digital entertainment system, wherein all content is distributed to digital-ready user terminals (e.g., digital set-top boxes, digital televisions, etc.) in digital form.

The invention claimed is:

1. A method of providing direct access to content available on an entertainment system having a head end and a plurality of user terminals connected by a distribution system, the method comprising:

transmitting, from the head end, a content promotion that promotes content available for direct access by a user at a user terminal;

at the head end, tracking content promotion at all times by storing a start time and an end time of each promotion, wherein tracking further includes recording state changes that correspond with changing sequential promotions;

displaying the content promotion at the user terminal;

receiving, at the user terminal, a selection input made by the user on an input device;

time-stamping the selection input to electronically record a time at which the selection input was made;

transmitting, from the user terminal to the head end, the time-stamped selection input;

using the time recorded in the time-stamped selection input to identify content available for direct access that was being promoted by the content promotion being displayed at the user terminal at the time at which the selection input was made;

transmitting, from the head end to the user terminal, the content identified by the time recorded in the time-stamped selection input that was being promoted at the time at which the selection input was made by the user;

and delivering the content identified by the time recorded in the time-stamped selection input to the user at the user terminal.

2. The method of claim 1, and further comprising:

providing, at the user terminal, instructions to the user as to user input required on the input device for direct access to content being promoted by the content promotion.

3. A method of delivering content in an entertainment system without requiring a user to navigate a menu of content offerings, the method comprising:

transmitting a sequence of promotion of content offerings from a head end to a user terminal;

at the head end, tracking content promotion at all times by storing a start time and an end time of each promotion, wherein tracking further includes recording state changes that correspond with changing sequential promotions:

displaying at the user terminal a sequence of promotions of content offerings;

receiving at the user terminal a selection input representing a user selection made while a promotion for a specific content offering was being displayed at the user terminal;

time-stamping the selection input at the user terminal to electronically record a time at which the selection input was received;

transmitting the time-stamped selection input from the user terminal to the head end;

using the time recorded in the time-stamped selection input to identify a specific content offering being promoted on the sequence of promotions of content offerings at the time at which the selection input was received;

transmitting the specific content offering identified by the time recorded in the time-stamped selection input from the head end to the user terminal;

and delivering the specific content offering identified by the time recorded in the time-stamped selection input to the user at the user terminal.

4. The method of claim 3, and further comprising:
providing, at the user terminal, instructions to the user as to the selection input required for direct access to the specific content offering being displayed in the sequence of promotions of content offerings.

5. The method of claim 4, wherein the instructions to the user comprise an on-screen display on the user terminal.

6. The method of claim 4, wherein the instructions to the user comprise a scrolling message on a display at the user terminal.

7. An entertainment system comprising:
a plurality of user terminals, each user terminal including an input device and capable of time-stamping keystrokes from the input device;
a distribution system connected to the user terminals;
means for delivering, over the distribution system to the user terminals, a content promotions channel that presents to users a sequence of content offerings available for direct access;
a content server for storing entertainment content and transmitting to the distribution system signals based upon stored entertainment content;
and a computer which communicates with the user terminals over the distribution system, the computer receiving from the user terminals time-stamped keystrokes requesting direct access to the content and controlling transmission of content to the user terminals based on the time-stamped keystrokes, wherein the computer uses a time stamp in each time-stamped key stroke requesting direct access to content to identify a specific content offering being promoted on the content promotions channel when that keystroke was time-stamped and causes the content server to deliver the specific content offering identified by the time stamp in the time-stamped keystroke to the user terminal from which the time-stamped keystroke was received
wherein the computer further tracks content promotion at all times by storing a start time and an end time of each promotion, wherein tracking further includes recording state changes that correspond with changing sequential promotions.

8. The entertainment system of claim 7, wherein the input device is selected from the group consisting of a remote control, a keyboard, and a game controller.

* * * * *

UNITED STATES PATENT AND TRADEMARK OFFICE
CERTIFICATE OF CORRECTION

| | | |
|---|---|---|
| PATENT NO. | : 7,984,114 B2 | |
| APPLICATION NO. | : 11/052596 | |
| DATED | : July 19, 2011 | |
| INVENTOR(S) | : David M. Bankers et al. | |

It is certified that error appears in the above-identified patent and that said Letters Patent is hereby corrected as shown below:

Col. 1, Line 28
　Delete "ahead"
　Insert --a head--

Col. 6, Line 25
　Delete "multi-mediaports"
　Insert --multi-media ports--

Signed and Sealed this
Twenty-fifth Day of September, 2012

David J. Kappos
*Director of the United States Patent and Trademark Office*